(12) United States Patent
Kilby et al.

(10) Patent No.: US 6,293,390 B1
(45) Date of Patent: Sep. 25, 2001

(54) CONVEYOR FOR CONTINUOUS PROOFING AND BAKING APPARATUS

(75) Inventors: Leonard R. Kilby, Plano; John M. Lucido, Garland, both of TX (US); Joop Frans Hoekstra, Medfield, MA (US)

(73) Assignee: SASIB North America, Inc., Plano, TX (US)

( * ) Notice: Subject to any disclaimer, the term of this patent is extended or adjusted under 35 U.S.C. 154(b) by 0 days.

(21) Appl. No.: 09/792,096

(22) Filed: Feb. 23, 2001

Related U.S. Application Data

(62) Division of application No. 09/405,294, filed on Sep. 23, 1999.

(51) Int. Cl.$^7$ .......................... B65G 39/20; B65G 17/38; B65G 17/06
(52) U.S. Cl. ............................. 198/845; 198/850
(58) Field of Search ................... 198/850, 851, 198/845

(56) References Cited

U.S. PATENT DOCUMENTS

| | | | |
|---|---|---|---|
| 3,967,721 | * 7/1976 | Rhoden | 198/195 X |
| 4,440,294 | * 4/1984 | Langen | 198/838 X |
| 4,638,906 | * 1/1987 | Winiasz | 198/803.9 |
| 5,076,422 | * 12/1991 | Clopton | 198/838 X |
| 5,411,133 | * 5/1995 | Lyndhurst | 194/845 |

* cited by examiner

Primary Examiner—Joseph E. Valenza
Assistant Examiner—Kenneth W Bower
(74) Attorney, Agent, or Firm—Michael A. O'Neil

(57) ABSTRACT

In one embodiment, a conveyor comprises identical carriages and apparatus for connecting the carriages end to end. The carriages each include first wheel pairs supported for rotation about spaced apart parallel axes and a second wheel pair supported for rotation about a perpendicular axis. The first and second wheel pairs are rotatably supported by self-lubricated bearings. The connection apparatus may comprise either connection rods or a wire rope. In another embodiment, the conveyor comprises identical links each including first and second link portions. The link portions are pivotally interconnected by a first connecting pin which also supports a first pair of wheels. Adjacent links are interconnected by a second connecting pin which also supports a second wheel pair. The first and second wheel pairs are rotatably supported by self-lubricated bearings.

24 Claims, 17 Drawing Sheets

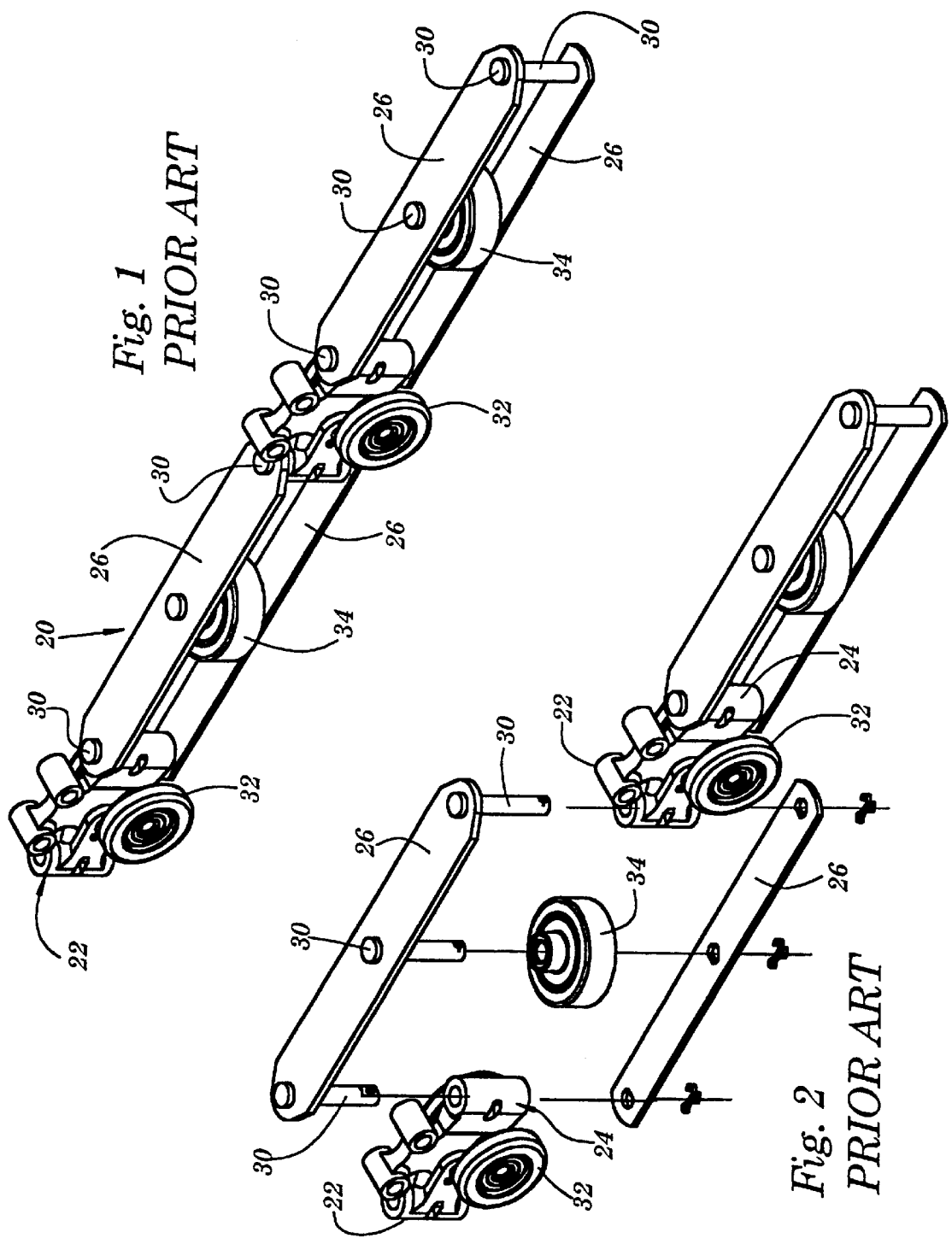

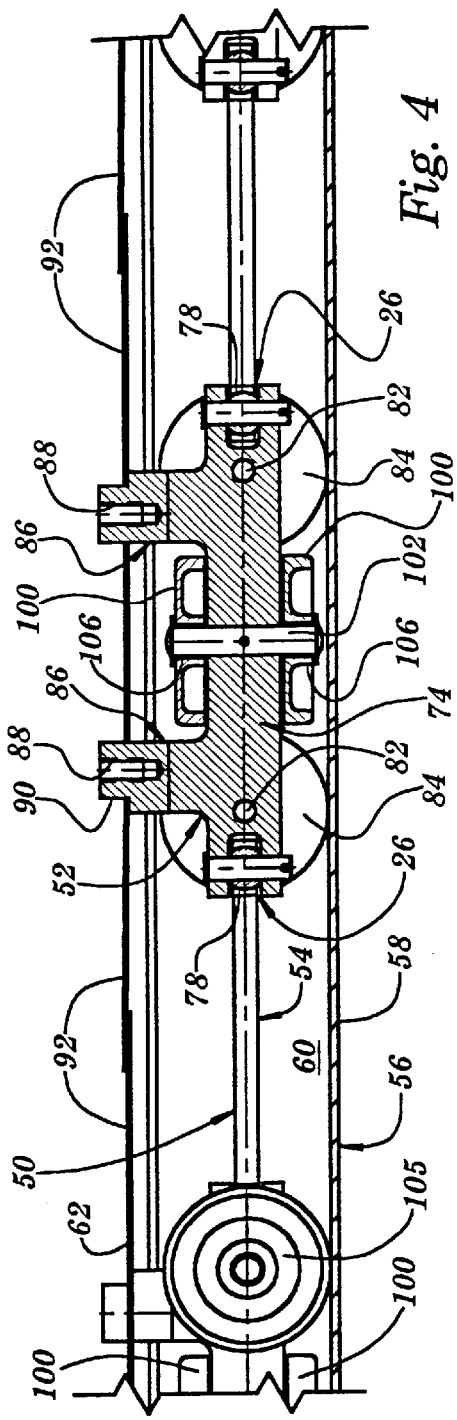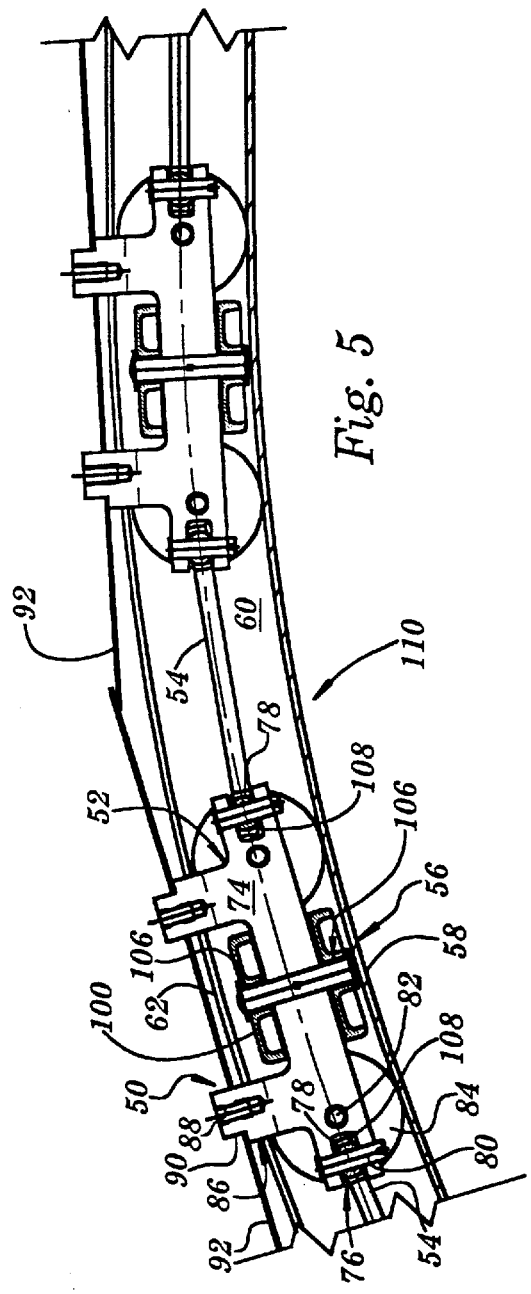

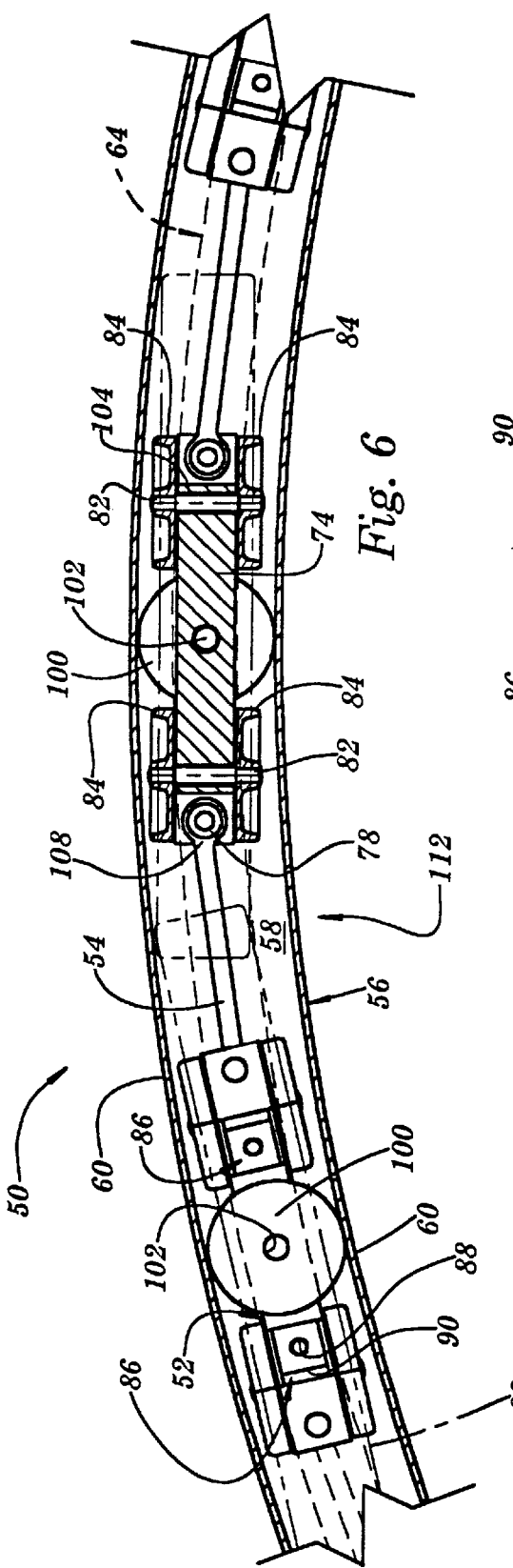
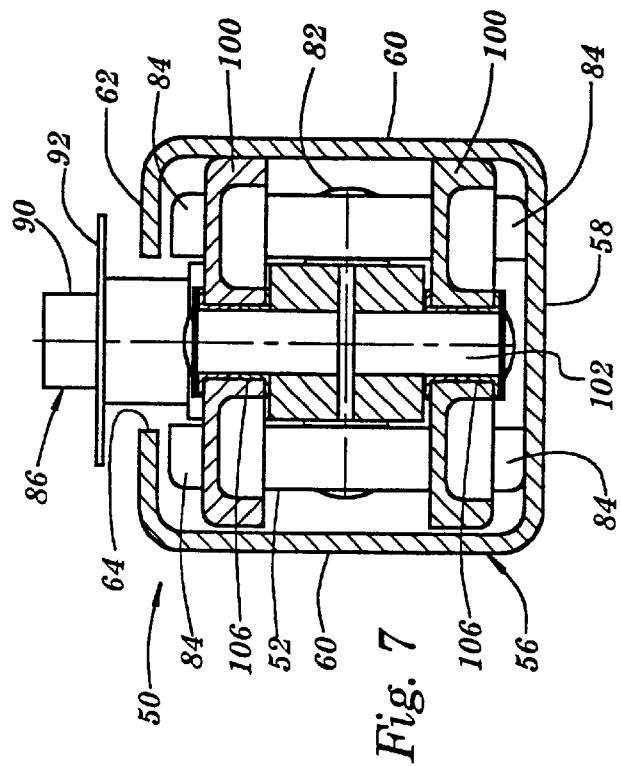

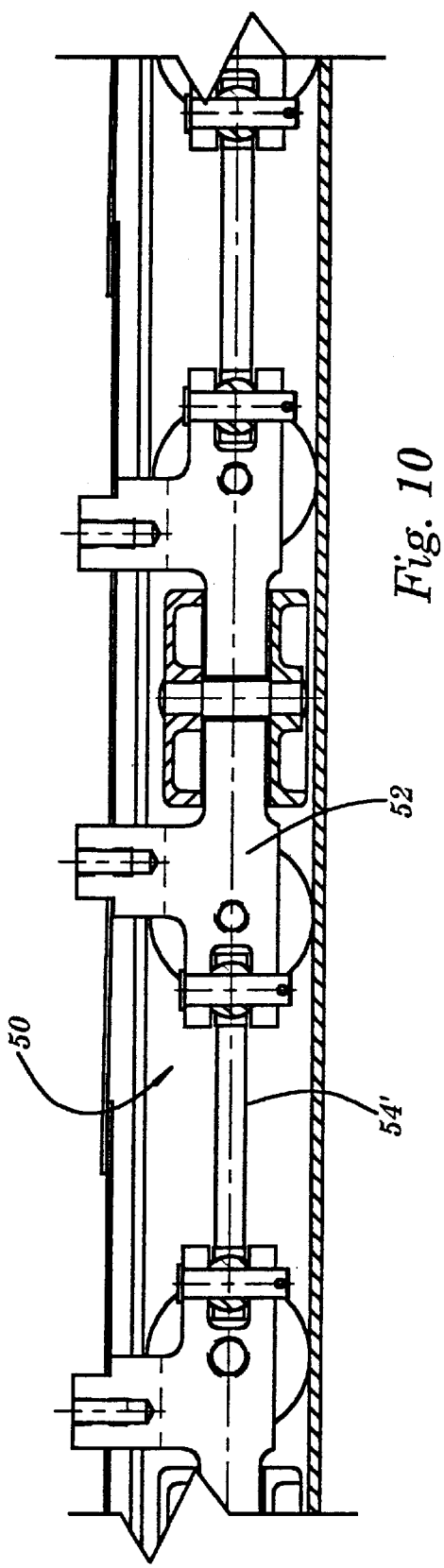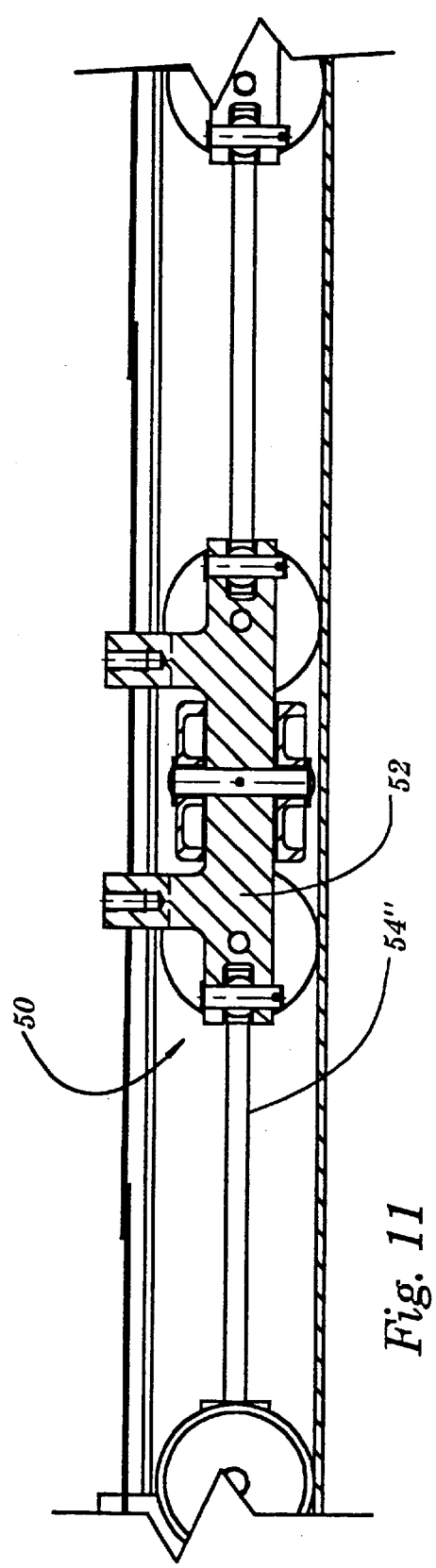

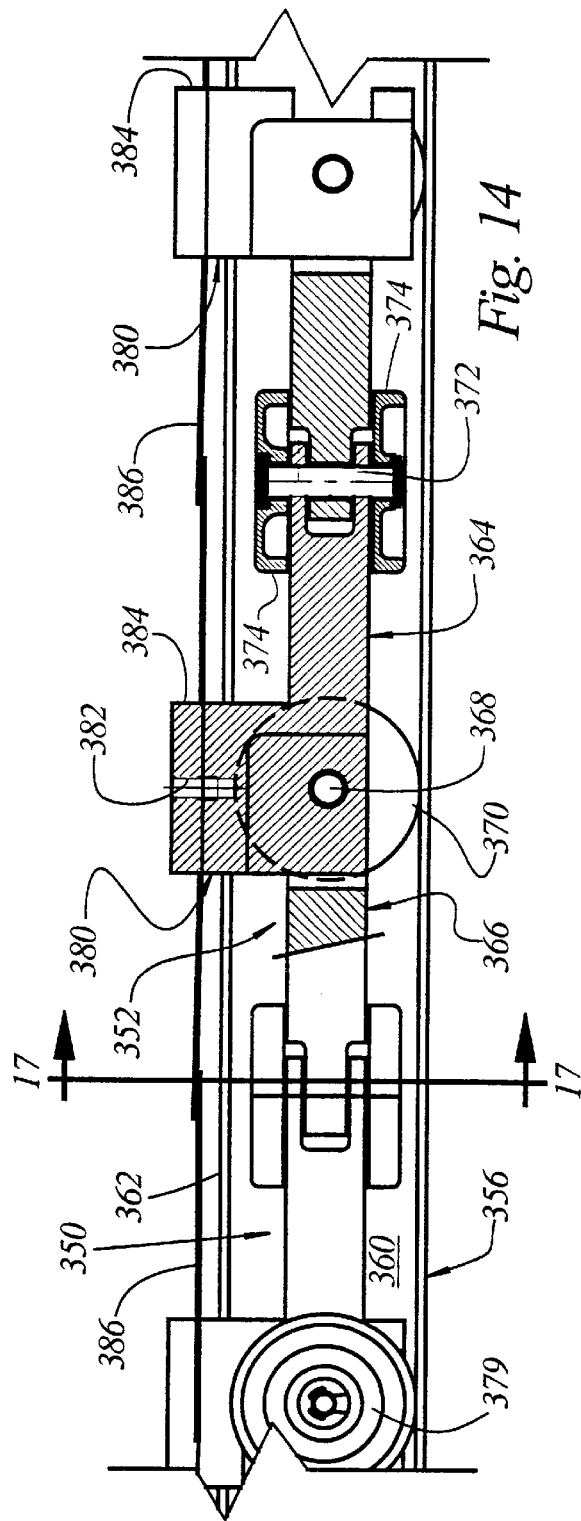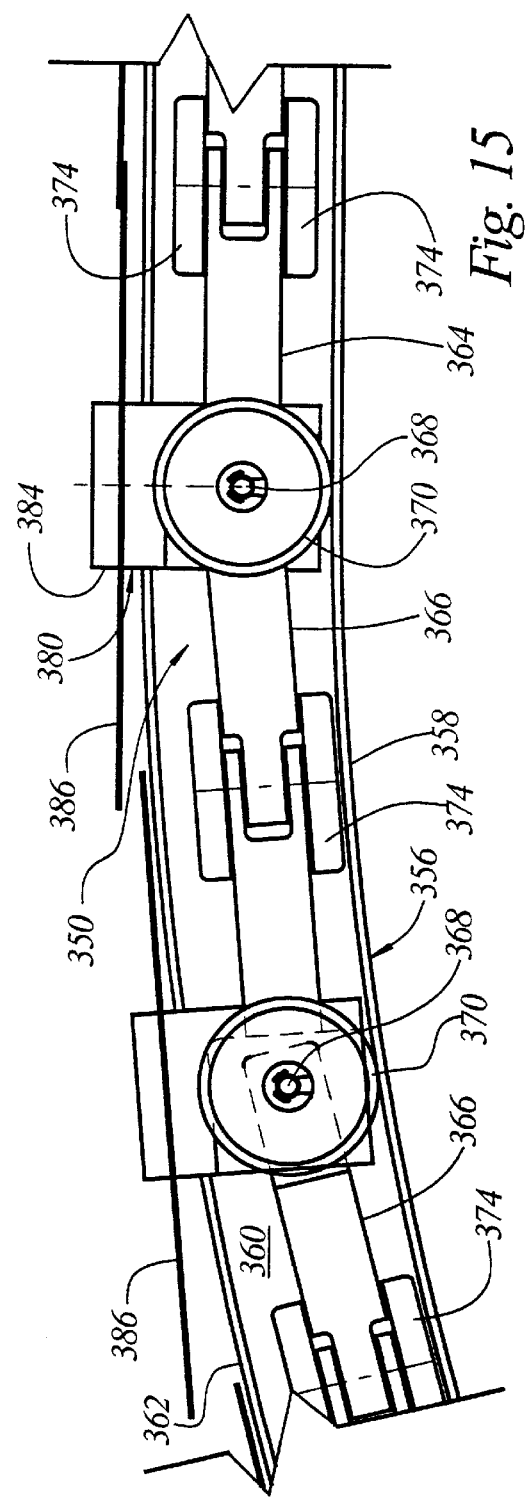

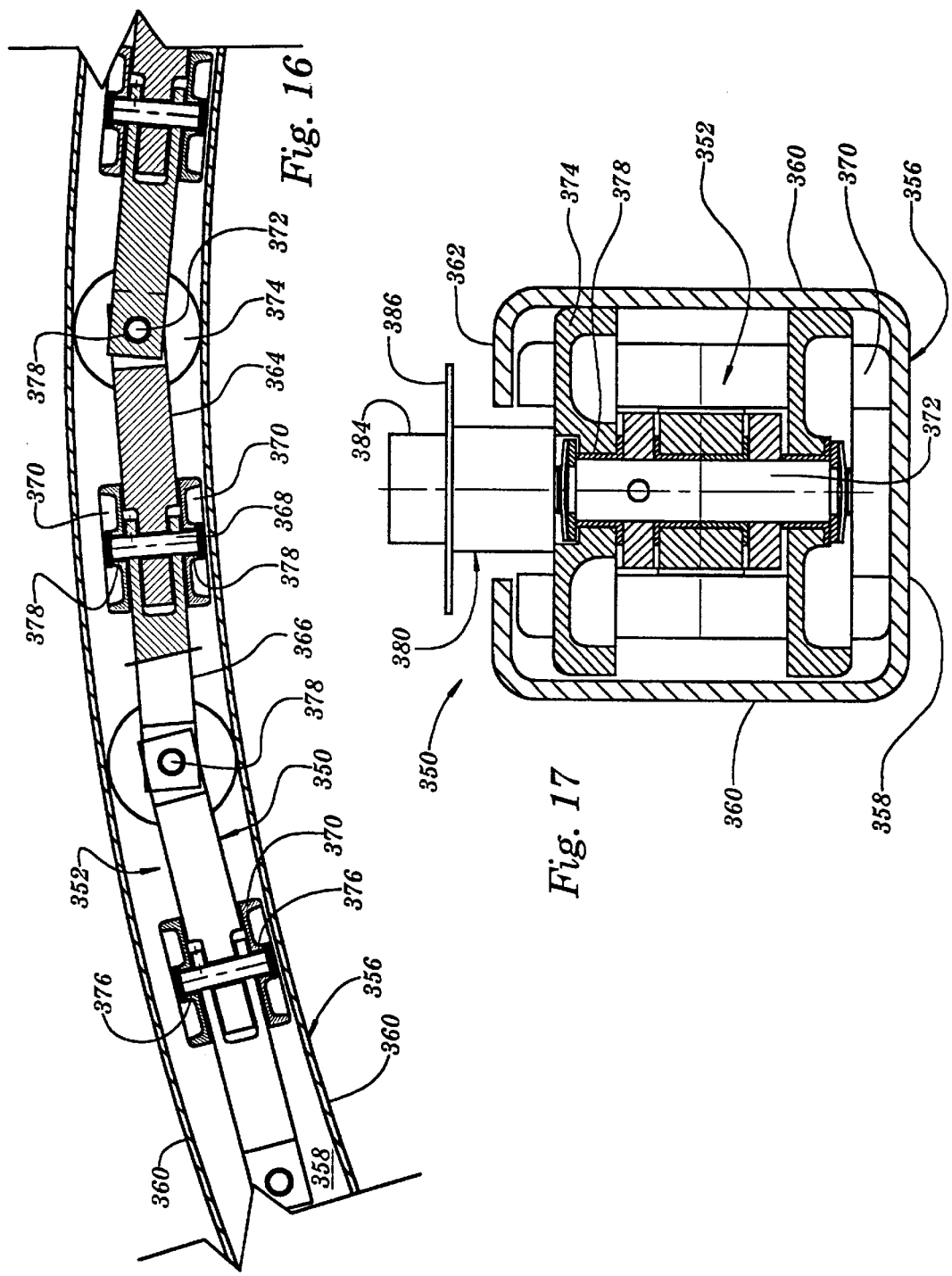

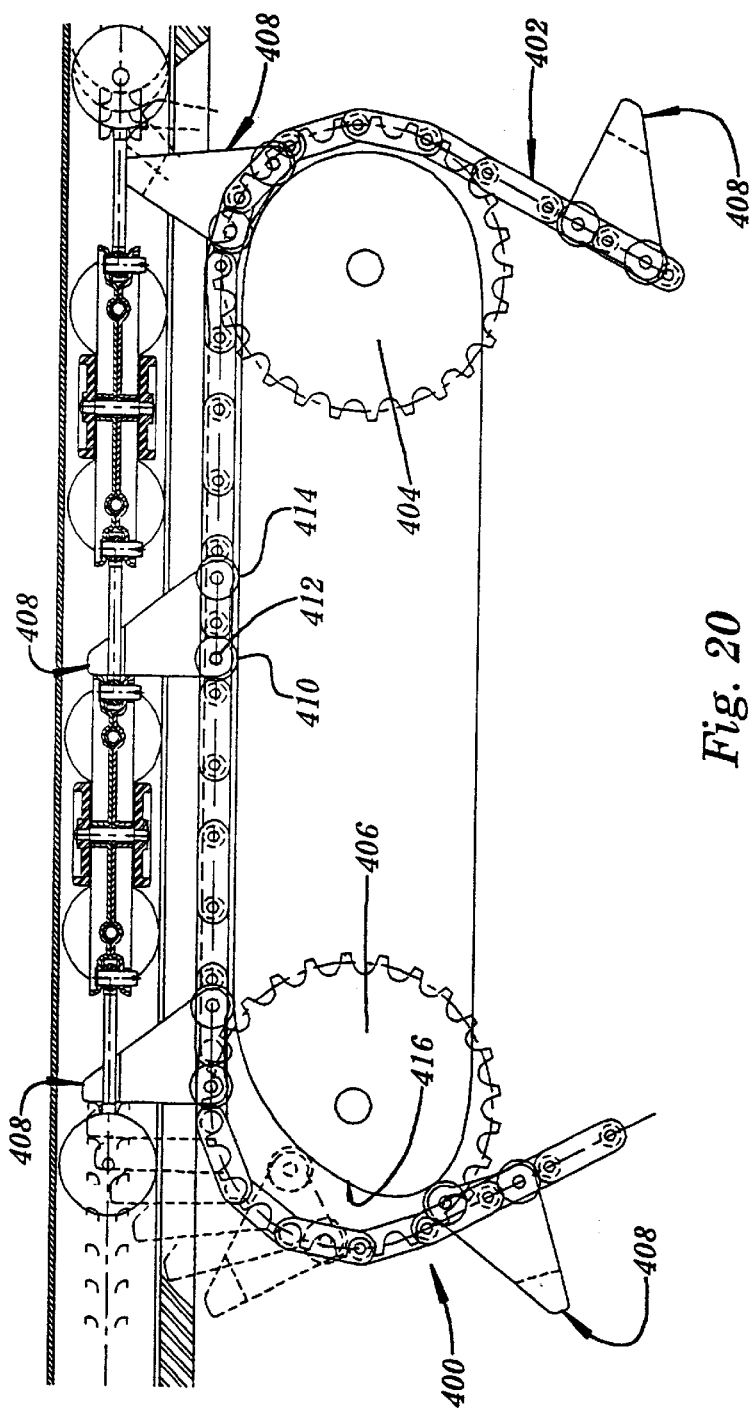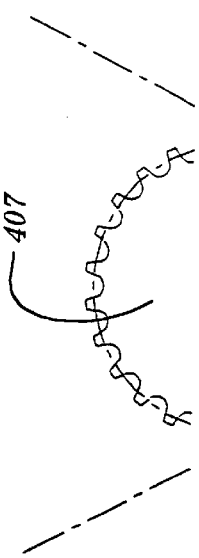
Fig. 20

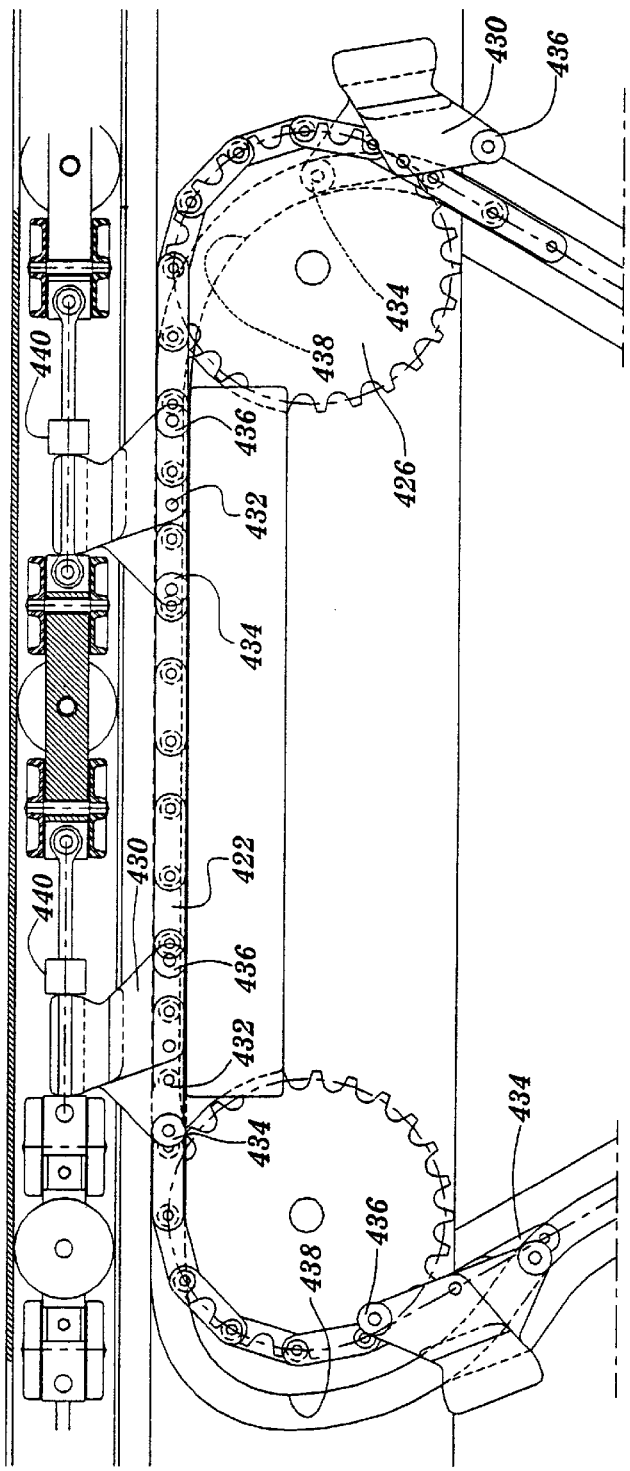
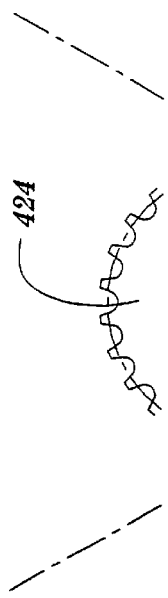
Fig. 22

CONVEYOR FOR CONTINUOUS PROOFING AND BAKING APPARATUS

This application is a Division of Ser. No. 09/405,294 filed Sep. 23, 1999.

TECHNICAL FIELD

The present invention generally relates to proofing and baking apparatus of the type utilized in large commercial bakeries, and more particularly to an improved conveyor for use in continuous proofing and baking apparatus which is characterized by extended service life and greater adaptability to the requirements of diverse baking operations.

BACKGROUND OF THE INVENTION

Modern large-scale commercial bakeries of the type utilized in the production of bread, sandwich buns, and similar dough products are frequently equipped with continuous proofing and baking apparatus. In the operation of a continuous proofer and/or oven, dough to be baked is received in bakery pans. The bakery pans are transported on grids which are supported on the links of a continuous chain. A drive mechanism actuates the chain to transport the bakery pans and the dough contained therein through a proofer wherein the dough is allowed to rise and/or through an oven wherein the dough is baked.

FIGS. 1, 2, and 3 illustrate a link 20 of the type comprising a prior art conveyor chain utilized in continuous proofing and baking apparatus. Each link 20 of conveyor chain includes a first connection member 22, a second connection member 24, and a pair of spaced, parallel plates 26. The first connection member 22 of a particular link 20 is connected to the second connection member 24 of the next preceding link in the chain by a pin 28 (FIG. 3) which facilitates pivotal movement between adjacent links in the nominally vertical plane. The plates 26 are connected to the first connection member 22 and to the second connection member 24 by pins 30 which facilitate relative pivotal movement between adjacent links in the nominally horizontal plane.

The first connection member 22 of each link 20 is provided with a pair of wheels 32. The wheels 32 support the link 20 for movement along a conveyor track 36 (FIG. 3). A wheel 34 is positioned between the plates 26. The wheel 34 functions to center the link 20 in the conveyor track 36.

Conveyor chains of the type illustrated in FIGS. 1–3 have gained widespread acceptance in the commercial baking industry and other industries. Notwithstanding this fact, such conveyor chains incorporate various deficiencies. For example, the wheels 32 which support each link 20 for moving along the conveyor track comprise anti-friction bearings which require periodic lubrication. Lubricating the chain is time consuming and expensive, and is frequently overlooked by bakery operators. Lack of lubrication leads to bearing failure which, at a minimum, requires the conveyor to be taken out of service to facilitate replacement of the failed bearings. As will be appreciated by those skilled in the art, substantially more serious consequences can and do result from bearing failure which can require the replacement of multiple links of the conveyor chain, entire sections of the conveyor track, etc.

Various factors lead to improper conveyor chain maintenance and lubrication. One of the most important involves the demands made on commercial bakeries by their customers for continuous high level production leaving no time for maintenance and lubrication procedures. An equally important factor is the lack of technicians having the training and experience necessary to properly perform conveyor chain maintenance and lubrication procedures when untrained and inexperienced personnel are employed to maintain and lubricate the conveyor chains used in continuous proofers and ovens, improper and inadequate maintenance and lubrication result.

A related problem attendant to the use of conveyor chains comprising links of the type shown in FIGS. 1–3 relates to the cleaning thereof. The lubricants which are used in the anti-friction bearings of the wheels 32 of the links 20 are incompatible with the use of water and detergents to clean the conveyor chain. It is therefore necessary to employ other, more costly, techniques in order to attain the level of cleanliness required in food manufacturing operations.

Even when proper lubrication and cleaning procedures are in place, the problems inherent in the use of the prior art chain are not resolved. Lubricant from the chain combines with debris from the dough products being baked to form a sludge which cannot be disposed of except pursuant to strict EPA guidelines. When the chain is used in an oven the high temperature environment causes the lubricant to thicken to the point that the bearings seize causing increased load on the conveyor drive system and increased chain and track wear.

The design of the link 20 illustrated in FIGS. 1 and 2 also involves difficulties in changing the pitch of the conveyor chain incorporating the link, that is, the distance between identical points on adjacent links. The inability to easily change the pitch of the conveyor chain in turn means that the conveyor chain cannot be readily customized to specific load profiles, for example lengthening the pitch for light load applications and reducing the pitch for heavy load applications.

Yet another problem involves the fact that the wheels 34 positioned between the plates 26 do not restrain the links of the chain from bending and tipping. When tipping occurs, the wheels 34 act as can openers cutting slits into the side walls of the conveyor track. Tipping also tilts the grids supported on the conveyor chain which can cause displacement of the bakery pans carried by the grids.

SUMMARY OF THE INVENTION

The present invention comprises improvements in the design of conveyor chains adapted for use in conveyorized proofers, conveyorized ovens, and similar applications which overcome the foregoing and other difficulties long since associated with the prior art. In accordance with one feature of the invention, conveyor chains intended for use in baking operations are provided with bearings which do not require lubrication. For example, when used in proofers, the bearings of the conveyor chain may comprise sleeve bearings formed from plastic materials which are self-lubricating and adapted for utilization in high temperature environments of the type encountered in a bakery oven. Conveyor chains used in ovens may be equipped with self-lubricating graphite bearings of the type sold by Graphite Metallizing Corporation of Yonkers, N.Y. under the trademark GRAPHALLOY®. Alternatively, the conveyor chain may be provided with sealed self-lubricating anti-friction bearings suitable for high temperature applications.

The use of bearings which do not require lubrication in conveyor chains intended for bakery applications is advantageous for at least two reasons. First, by eliminating the lubrication function which heretofore has proven to be problematical, substantial cost savings are effected. Of equal importance is the elimination of conveyor chain failures stemming from improper lubrication. The elimination of the lubrication requirement also facilitates the cleaning of the conveyor track by simply attaching a scraper to the conveyor chain. The scraper pushes bakery debris along the track to an opening in the bottom wail thereof where the debris is accumulated for disposal as ordinary refuse.

Those skilled in the art will understand that some types of self-lubricating bearings useful in the practice of the present invention may initially have a higher coefficient of friction as compared with the anti-friction bearings currently in use. Depending on the geometries of the components, a higher coefficient of friction can result in higher loads imposed on the conveyor drive system. However, the coefficient of friction of the currently used anti-friction bearings tends to increase over time, particularly in the absence of proper lubrication. Thus, the use of self-lubricating bearings is advantageous in that the loading of the conveyor drive system remains substantially constant throughout the life of the conveyor.

Another feature of the invention comprises the use of compact carriages to support the bakery pan receiving grids. Adjacent carriages are connected one to the other by connection members which can comprise either connection rods or connecting cables. The compact carriage/connection member design is advantageous in that it is readily adapted to changes in pitch, whereby the conveyor chain in the present invention can be easily customized to a range of conveyor loading situations.

In accordance with the preferred embodiment of the invention, the conveyor chain is comprised of a plurality of identical links having spaced apart pairs of vertically disposed and horizontally disposed wheels. The diameters of the wheels are closely matched to the interior dimensions of the track whereby the wheels prevent the chain from bending or twisting. Another important feature is the fact that the chain is economical to manufacture and assemble.

BRIEF DESCRIPTION OF THE DRAWINGS

A more complete understanding of the invention may be had by reference of the following Detailed Description when taken in conjunction with the accompanying Drawings wherein:

FIG. 1 is an exploded perspective view of a link of a prior art conveyor chain;

FIG. 2 is a perspective view of the link of FIG. 1;

FIG. 4 is a side view of a conveyor chain comprising a first embodiment of the present invention in which certain parts have been broken away more clearly to is illustrate certain features of the invention;

FIG. 5 is a view similar to FIG. 4 showing the conveyor chain of FIG. 4 operating in a vertically curved section of conveyor track;

FIG. 6 is a top view of the conveyor chain of FIG. 4 showing the conveyor chain operating in a horizontally curved section of conveyor track;

FIG. 7 is a transverse sectional view of the conveyor chain of FIG. 4;

FIG. 10 is a view similar to FIG. 4 showing a conveyor chain having a shorter pitch as compared with that of the conveyor chain of FIG. 4;

FIG. 11 is a side view similar to FIG. 4 showing a conveyor chain having a longer pitch as compared with that of the conveyor chain of FIG. 4;

FIG. 14 is a side view of a conveyor chain comprising a fourth and preferred embodiment of the invention in which certain parts have been broken away more clearly to illustrate certain features of the invention;

FIG. 15 is a side view of the conveyor chain of FIG. 14 showing the conveyor chain operating in a vertically curved section conveyor track;

FIG. 16 is a top view of the conveyor chain of FIG. 14 showing the conveyor chain operating in a horizontally curved section of conveyor track;

FIG. 17 is a transverse sectional view of the conveyor chain of FIG. 14;

FIG. 20 is a diagrammatic illustration of a conveyor chain drive mechanism useful in the practice of the invention;

FIG. 22 is a diagrammatic illustration of the conveyor chain drive mechanism of FIG. 21 showing the utilization thereof in conjunction with a conveyor chain having a longer pitch as compared with that of the conveyor chain of FIG. 18;

DETAILED DESCRIPTION

Figure 3:
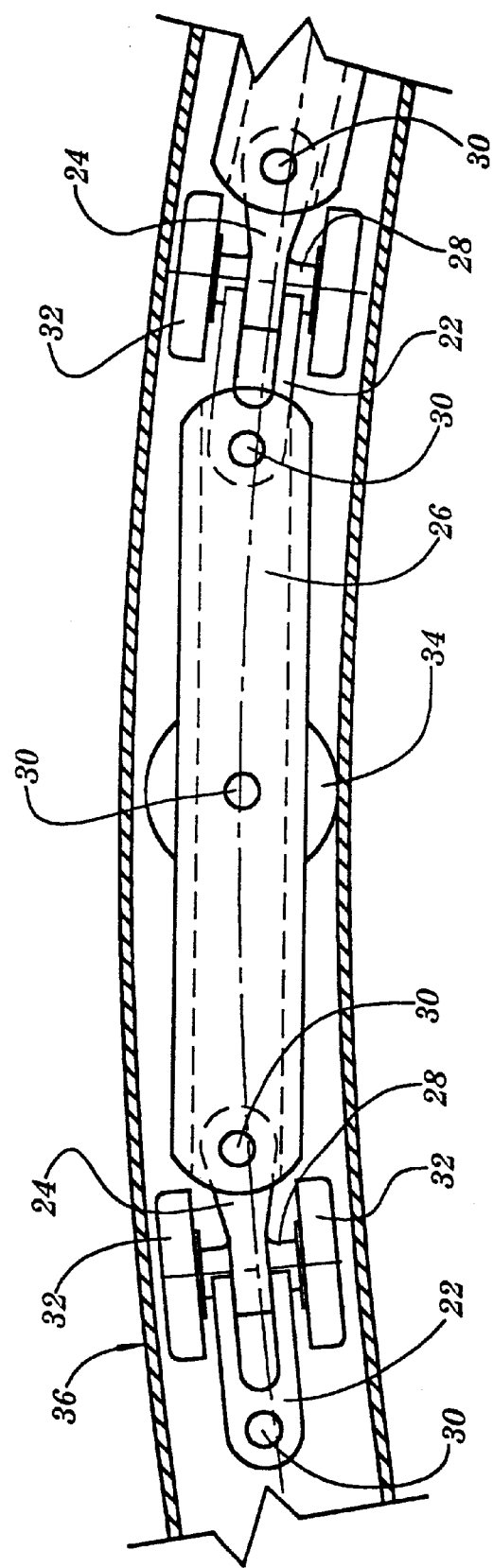
FIG. 3 is a top view of a conveyor chain comprising links of the type shown in FIGS. 1 and 2.

Referring now to the Drawings, and particularly to FIGS. 4, 5, 6, 7, 8, and 9 thereof, there is shown a conveyor chain 50 comprising a first embodiment of the invention. The conveyor chain 50 comprises a plurality of identical compact carriages 52 which are connected end to end by a plurality of identical connection members 54. This conveyor chain 50 operates in a conveyor track 56 comprising a solid bottom wall 58; opposed, solid side walls 60; and a top wall 62 having a center slot 64 formed therein.

Each of the compact carriages 52 comprises a unitary structure which may be manufactured from a variety of materials utilizing conventional manufacturing techniques. For example, the compact carriages 52 may be manufactured from steel and/or other metals by means of die casting, investment casting, or other well known manufacturing processes. Alternatively, the compact carriages 52 may be formed from various plastic materials suitable for high temperature applications, and may be manufactured utilizing conventional processes such as injection molding. Preferably, the material and the process used in the manufacture of compact carriages 52 are selected such that few if any machining operations are required in order to complete the manufacture thereof.

Each compact carriage 52 comprises an elongate body 74 having identical openings 76 formed in the opposite ends thereof. Each opening 76 receives a spherical bushing 78 which in turn receives the en d portion of on e of the connection members 54. The spherical bushings 78 are retained in the openings 76 by pins 80.

Axles 82 extend through the body 74 at points situated inwardly from the opening 76. The axles 82 support pairs of wheels 84 which in turn support the conveyor chain 50 for movement along the track 56. Bosses 86 extend upwardly from the body 74 and in turn support a grid (not shown) which receives and transports bakery pans having dough received therein along the length of the track 56. The bosses 86 may be provided with drilled and tapped apertures 88 which receive threaded fasteners to secure the grid thereto. Examples of grids which may be used in the practice of the invention are shown and described in U.S. Pat. Nos. 4,729, 470, 4,760,911, and 4,836,360, all of which are owned by the assignee hereof and incorporated herein by reference.

Each of the bosses 86 may have a dimensionally reduced portion 90 at the upper end thereof. Top plates 92 are supported on the bosses 86 and receive the portions 90 therethrough. The top plates 92 function to prevent debris from entering the track 56 through the slot 64.

Each compact carriage 52 is further provided with a pair of wheels 100. The wheels 100 function to locate the compact carriage 52 relative to the side walls 60 of the track 56. The wheels 100 are rotatably supported on a pin 102 extending through the body 74 of the compact carriage 52. As is best shown in FIG. 7, the wheels 100 cooperate with the wheels 84 to completely prevent bending and tipping of the conveyor chain 50.

Figure 9:
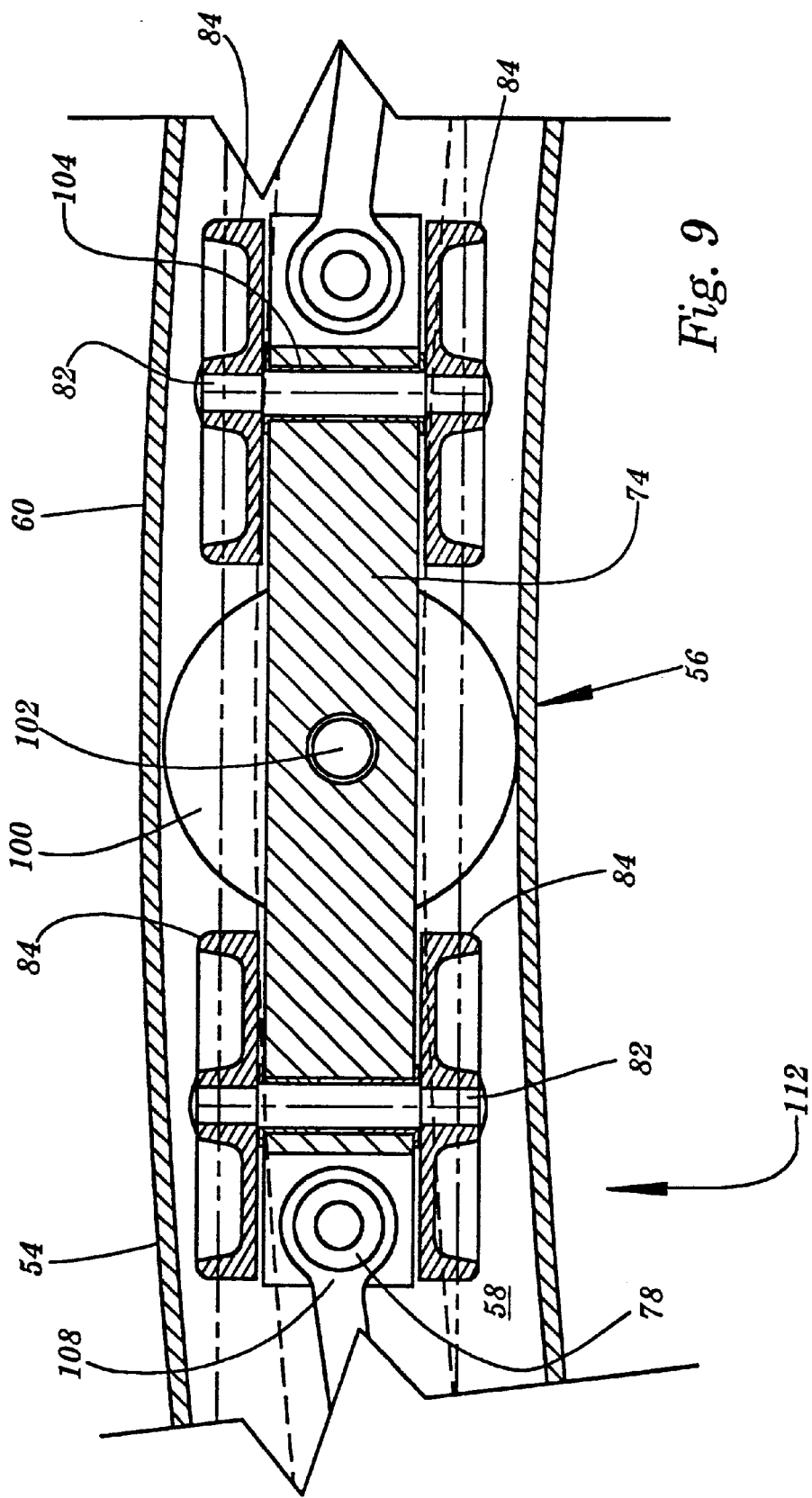
FIG. 9 is an enlargement of a portion of FIG. 6.

Referring particularly to FIG. 9, the wheels 84 are secured to the axle 82 for rotation therewith. The axles 82 of conveyors intended for use in proofers may be supported by a self-lubricating plastic bearing 104 which may be of the type manufactured by Igus Spritzgussteile fur die Industrie GmbH (Igus) of Koln (Cologne), Germany and sold under the trademark IGLIDE®. In oven applications the self-lubricating bearings 104 may be of the type sold by Graphite Metallizing Corporation of Yonkers, N.Y., under the trademark GRAPHALLOY®. The bearings 104 do not require lubrication in order to rotatably support the axles 82 and the wheels 84 supported thereon. Therefore, by means of the present invention, the need for lubrication of the wheels which support the carriages 52 is eliminated as are the problems attendant to the failure to provide required lubrication and difficulties associated with cleaning conveyor chains in which lubricating fluids are used. As is shown in FIG. 4, the wheels 84 may be rotatably supported by sealed self-lubricating anti-friction bearings 105 in lieu of the plastic bearings 104.

Figure 8:
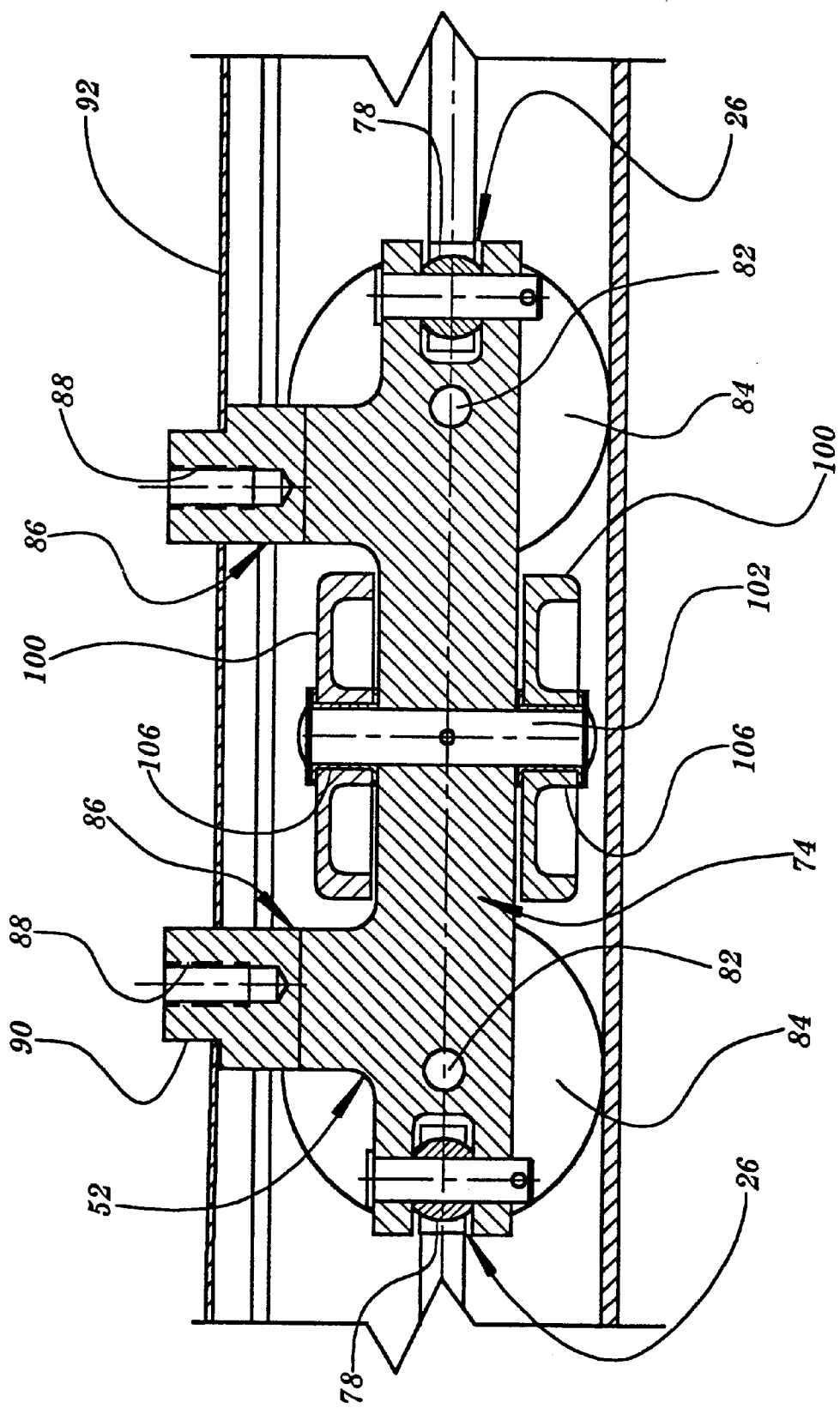
FIG. 8 is an enlargement of a portion of FIG. 4.

Referring to FIG. 8, the wheels 100 are rotatable supported on the pin 102. In conveyors used in proofers, self-lubricating plastic bearings 106 also manufactured by Igus are provided at the opposite ends of the pin 102 and in turn rotatably support the wheels 100 thereon. Conveyors for oven use may have bearings 106 of the type sold by Graphite Metallizing. Again, the use of self-lubricating bearings 106 to rotatably support the wheels 100 on the pin 102 eliminates the need for lubrication.

As is best shown in FIGS. 6 and 9, each connector member 54 has an eye 108 at each end thereof. Each eye 108 receives the spherical bushing 78 of one of the compact carriages 52. In this manner, the eyes 108 of the connection members 54 and the spherical bushings 78 of the compact carriages 52 facilitate the movement of the conveyor chain 50 along inclined and curved portions of the track 56. For example, FIG. 5 illustrates the movement of the conveyor chain 50 along a vertically curved portion 110 of the track 56. FIG. 6 illustrates the movement of the conveyor chain So along a horizontally curved portion 112 of the track 56. As will be appreciated by reference to FIGS. 5 and 6, the movement of the conveyor chain 50 along vertically and horizontally curved portions of the track 56 is accomplished without interference between the conveyor chain 50 and the track 56.

FIG. 7 illustrates the relationship between the wheels 84 and 100 of the conveyor chain 50 and the track 56. The wheels 84 travel along the bottom wall 58 of the track 56 and support the conveyor chain 50 of the movement through the track 56. The wheels 100 serve to center the conveyor chain 50 in the track 56 and to prevent interference of the conveyor chain 50 with the track 56 as the conveyor chain 50 moves therethrough. Again, the wheels 84 and 100 cooperate to prevent bending and tipping of the conveyor chain 50.

Referring to FIGS. 10 and 11, one of the advantages in the use of the conveyor chain in the present invention comprises the adaptability thereof to changes in pitch. Thus, in FIG. 10 the compact carriages 52 are connected end to end by connection members 54' which are substantially shorter than the connection members 54 of the embodiment of the invention illustrated in FIGS. 4, 5, and 6. The use of the connection members 54' in lieu of the connection members 54 results in a conveyor chain 50 having a substantially shorter pitch. The use of a conveyor chain having a shorter pitch is advantageous in those instances in which the conveyor chain is used to transport either heavier bakery pans or bakery pans carrying heavier loads as compared with the loading of a conveyor chain having a longer pitch.

Referring to FIG. 11, there is shown a conveyor chain 50 wherein the compact carriages 52 are connected end to end by connection members 54" which are substantially longer than the connection members 54 of the conveyor chain 50 illustrated in FIGS. 4, 5, and 6. The use of the longer connection members 54" in the conveyor chain 50 of FIG. 9 results in the conveyor chain having a substantially longer pitch as compared with the pitch of the conveyor chain 50 shown in FIGS. 4, 5, and 6. The use of a conveyor chain having a longer pitch is advantageous in those instances in which the conveyor chain is called upon to carry either lighter bakery pans or bakery pans carrying lighter loads as compared with the loading of the conveyor chain 50 of FIGS. 4, 5, and 6.

Figure 12:
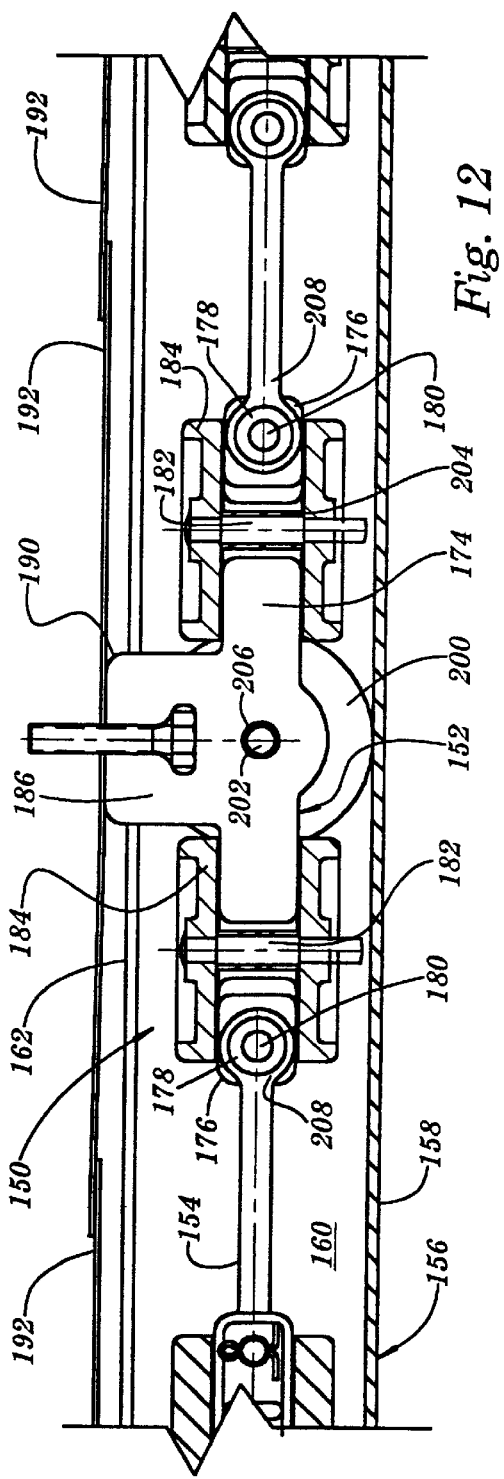
FIG. 12 is a side view similar to FIG. 4 illustrating a conveyor chain comprising a second embodiment of the invention.

Referring to FIG. 12, there is shown a conveyor chain 1SO comprising a second embodiment of the invention. The conveyor chain 150 comprises a plurality of identical compact carriages 152 which are connected end to end by a plurality of identical connection members 154. The conveyor chain 150 operates in a conveyor track 156 comprising a solid bottom wall 158; opposed, solid side walls 160; and a top wall 162 having a center slot formed therein.

Each of the compact carriages 152 comprises a unitary structure which may be manufactured from a variety of materials utilizing conventional manufacturing techniques. For example, the compact carriages 152 may be manufactured from steel and/or other metals by means of die casting, investment casting, or other well known manufacturing processes. Alternatively, the compact carriages 152 may be formed from various plastic materials adapted for high temperature applications, and may be manufactured utilizing conventional processes such as injection molding.

Preferably, the materials and the process used in the manufacture of compact carriages 152 are selected such that few if any machining operations are required in order to complete the manufacture thereof.

Each compact carriage 152 comprises an elongate body 174 having identical openings 176 formed in the opposite ends thereof. Each opening 176 receives a spherical bushing 178 which in turn receives the end portion of one of the connection members 154. The spherical bushings 178 are retained in the openings 176 by pins 180.

Axles 182 extend through the body 174 at points situated inwardly from the opening 176. The axles 182 support pairs of wheels 184 which center the conveyor chain 150 in its movement along the track 156. The axles are extended downwardly to prevent excess tipping of the compact carriages. A boss 186 extends upwardly from the body 174 and in turn support a grid (not shown) which receives and transports bakery pans having dough received therein along the length of the track 156. The boss 186 may be provided with a drilled and tapped aperture 188 which receives a threaded fastener to secure the grid thereto. Examples of grids which may be used in the practice of the invention are shown and described in U.S. Pat. Nos. 4,729,470, 4,760,911, and 4,836,360, all of which are owned by the assignee hereof and incorporated herein by reference.

Each boss 186 may have a dimensionally reduced portion 190 at the upper end thereof. A top plate 192 is supported on each boss 196 and receives the portion 190 therethrough. The top plates function to prevent debris from entering the track 156 through the slot in the top wall 162.

Each compact carriage 152 is further provided with a pair of wheels 200. The wheels 200 function to support the compact carriage 152 for movement along the bottom wall 158 of the track 156. The wheels 200 are rotatably supported on a pin 202 extending through the body 174 of the compact carriage 152.

The wheels 184 are secured to the axle 182 for rotation therewith. Each axle 182 is rotatably supported by a self-lubricating bearing 204. The bearings 204 do riot require lubrication in order to rotatably support the axles 182 and the wheels 184 supported thereon. Therefore, by means of the present invention, the need for lubrication of the wheels which support the carriages 152 is eliminated as are the problems attendant to the failure to provide required lubrication and difficulties associated with cleaning conveyor chains in which lubricating fluids are used.

Like the rotational support for the wheels 184, the wheels 200 are secured to the pin 202. A self-lubricating bearing 206 rotatably supports the pin 202 and the wheels 200 mounted thereon. Again, the use of the self-lubricating bearings 206 to rotatably support the wheels 200 and the pin 202 eliminates the need for lubrication.

Each connector member 154 has an eye 208 at each end thereof. Each eye 208 receives a spherical bushing 178 of one of the compact carriages 152. In this manner, the eyes 208 of the connection members 154 and the spherical bushings 178 of the compact carriages 152 facilitate the movement of the conveyor chain 150 along vertically and horizontally curved portions of the track 156.

Figure 13:
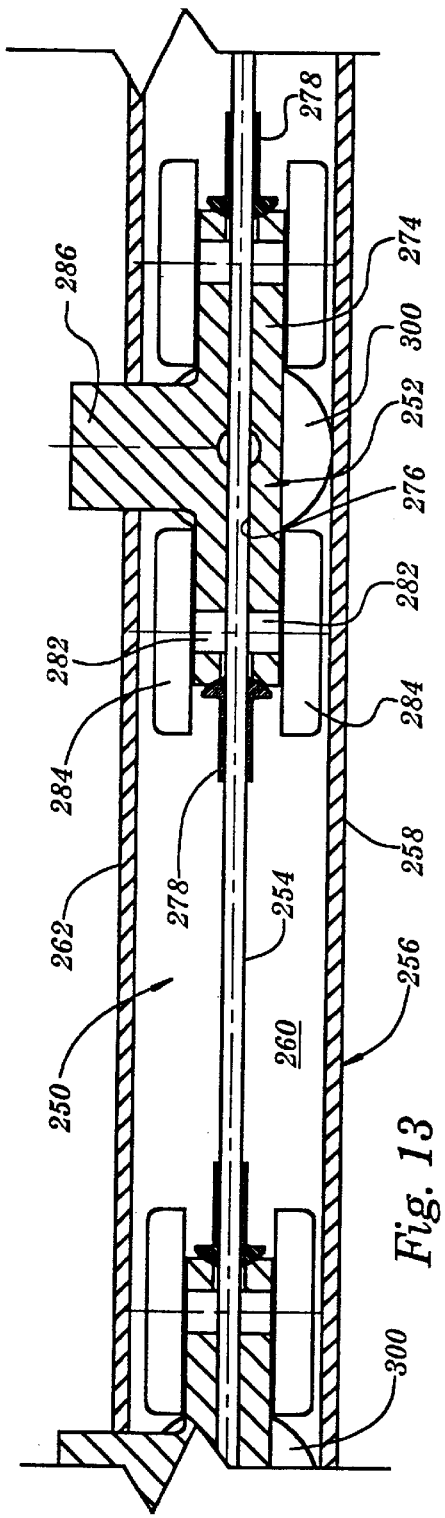
FIG. 13 is a side view similar to FIG. 4 illustrating a conveyor chain comprising a third embodiment of the invention.
Figure 18:
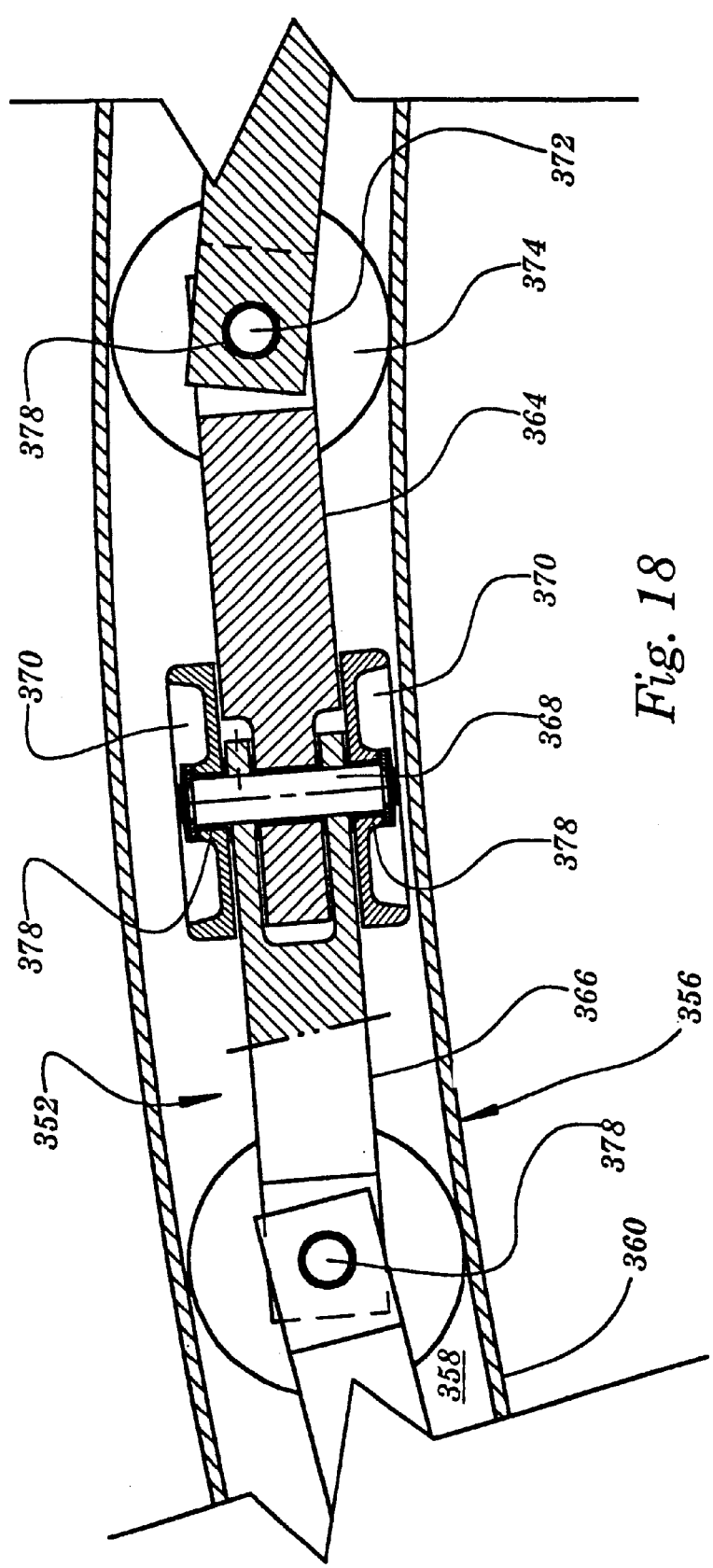
FIG. 18 is an enlargement of a portion of FIG. 14.

Referring to FIG. 13, there is shown a conveyor chain 250 comprising a third embodiment of the invention. The conveyor chain 250 comprises a plurality of identical compact carriages 252 which are connected at equally spaced intervals along a wire rope 254. The conveyor chain 250 operates in a conveyor track 256 comprising a solid bottom wall 258; opposed, solid side walls 260; and a top wall 262 having a center slot formed therein Each of the compact carriages 252 comprises a unitary structure which may be manufactured from a variety of materials utilizing conventional manufacturing techniques. For example, the compact carriages 252 may be manufactured from steel and/or other metals by means of die casting, investment casting, or other well known manufacturing processes. Alternatively, the compact carriages 252 may be formed from various plastic materials suitable for high temperature applications, and may be manufactured utilizing conventional processes such as injection molding. Preferably, the material and the process used in the manufacture of compact carriages 252 are selected such that few if any machining operations are required in order to complete the manufacture thereof.

Each compact carriage 252 comprises an elongate body 274 having an opening 276 extending axially therethrough. The opening 276 receives the wire rope 254. Compression sleeves 278 mounted on the wire rope 254 locate and secure each compact carriage 252 thereon.

Axles 282 extend outwardly from the body 274 at points situated inwardly from ends thereof. The axles 282 support pairs of wheels 284 which center conveyor chain 250 for moving along the track 256. A boss 286 extends upwardly from the body 274 and in turn supports a grid (not shown) which receives and transports bakery pans having dough received therein along the length of the track 256. The boss 286 may be provided with a drilled and tapped aperture which receives a threaded fastener to secure the grid thereto. Examples of grids which may be used in the practice of the invention are shown and described in U.S. Pat. Nos. 4,729,470, 4,760,911, and 4,836,360, all of which are owned by the assignee hereof and incorporated herein by reference.

The boss 286 may have a dimensionally reduced portion at the upper end thereof. A top plate may be supported on the boss 286 and receive the dimensionally reduced portion therethrough. If used, the top plates function to prevent debris from entering the track 256 through the slot in the top wall 262.

Each compact carriage 252 is further provided with a pair of wheels 300. The wheels 300 function to support the compact carriage 252 for movement along the bottom wall of the track 256. The wheels 300 are rotatably supported on pins 302 extending from the body 274 of the compact carriage 252.

The wheels 284 are each rotatably supported by a self-lubricating bearing. The self-lubricating bearings do not require lubrication in order to rotatably support the wheels 284. Therefore, by means of the present invention, the need for lubrication of the wheels which support the carriages 252 is eliminated as are the problems attendant to the failure to provide required lubrication and difficulties associated with cleaning conveyor chains in which lubricating fluids are used. The wheels 300 are also rotatably supported by self-lubricating bearings.

Referring to FIGS. 14, 15, 16, 17, and 18, there is shown a conveyor chain 350 comprising a fourth and preferred embodiment of the invention. The conveyor chain 350 comprises a plurality of identical links 352 which are connected end to end to form the chain 350. The conveyor chain 350 comprising the links 352 is adapted for movement along the length of a conveyor track 356 comprising a solid bottom wall 358; opposed, solid side walls 360; and a top wall 362 having a central slot formed therein.

Each component of the links 352 comprises a unitary structure which may be manufactured from a variety of materials utilizing conventional manufacturing techniques.

For example, the links 352 may be manufactured from steel and/or other metals by means of die casting, investment casting, or other well known manufacturing processes. Alternatively, the links may be formed from various plastic materials adapted for high temperature applications, and may be manufactured utilizing conventional processes such as injection molding. Preferably, the material and the process used in the manufacture of links are selected such that few if any machining operations are required in order to complete the manufacture thereof.

Each link 352 comprises a first link portion 364 and a second link portion 366. Each first link portion 364 is connected to its corresponding second link portion 366 by a pin 368 which facilitates relative pivotal movement between the link portions in the nominally vertical plane. Each pin 368 also has mounted thereon a pair of wheels 370 which support the link 352 for movement along the bottom wall 358 of the track 356.

The second link portion 366 of each link 352 is connected to the first link portion 364 of the immediately following link 352 by a pin 372. Thus, the pins 372 facilitate relative pivotal movement of the links 352 of the conveyor chain 350 in the nominally horizontal plane. Each pin 372 also supports two wheels 374 which serve to center the conveyor chain 350 and the track 356. As is best shown in FIG. 17, the diameters of the wheels 370 and 374 are closely matched to the interior dimensions of the track 356 whereby the wheels 370 and 374 completely prevent bending or tipping of the chain 350.

The pins 368 and 372 of the links 352 facilitate the movement of the conveyor chain 350 along inclined and curved portions of the track 356. For example, FIG. 15 illustrates the movement of the conveyor chain 350 along a vertically curved portion of the track 356. FIG. 16 illustrates the movement of the conveyor chain 350 along a horizontally curved portion of the track 356. As will be appreciated by reference to FIGS. 15 and 16, the movement of the conveyor chain 350 along inclined and curved portions of the track 356 is accomplished without interference between the conveyor chain 350 and the track 356.

Referring particularly to FIGS. 14, 16, 17, and 18, the wheels 370 are rotatably supported on the pins 368 by self-lubricating bearings 376. Likewise, the wheels 374 are rotatably supported on the pins 372 by self-lubricating bearings 378. The use of the self-lubricating bearings 376 and 378 to rotatably support the wheels 370 and 374, respectively, eliminates the need for lubrication. As is shown in FIG. 14, the wheels 370 and 374 may be supported by sealed self-lubricating anti-friction bearings 379 adapted for high temperature applications in lieu of the bearings 376 and 378.

Each first portion 364 of each link 352 includes a boss 380 extending upwardly therefrom and through the slot in the top wall 362 of the track 356. Each boss 380 supports a grid (not shown) which receives and transports bakery pans having dough received therein along the length of the track 356. Each boss 380 may be provided with a drilled and tapped aperture 382 which receives a threaded fastener to secure the grid thereto. Examples of grids which may be used in the practice of the invention are shown and described in U.S. Pat. Nos. 4,729,470; 4,760,911; and 4,836,360, all of which are owned by the assignee hereof and incorporated herein by reference.

Each boss 380 may have a dimensionally reduced portion 384 at the upper and thereof. Top plates 386 are supported on the bosses 380 and receive the portions 384 therethrough. The top plates function to prevent debris from entering the track 356 through the slot in the top wall 362 thereof.

Figure 19:
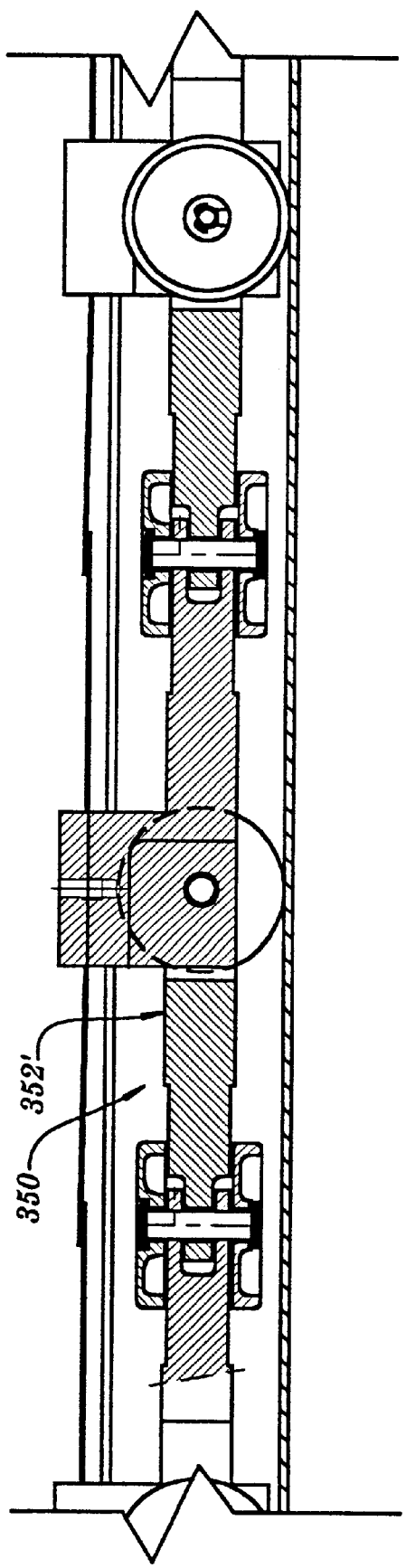
FIG. 19 is a view similar to FIG. 14 illustrating a conveyor chain having a longer pitch as compared with that of the conveyor chain of FIG. 14.

Referring to FIG. 19, one of the advantages of the use of the conveyor chain in the present invention comprises the adaptability thereof to changes in pitch. Thus, in FIG. 19 there is shown a conveyor chain 350 having links 352' which are substantially longer than the links 352 of the conveyor chain 350 illustrated in FIGS. 14, 15, and 16. The use of the longer links 352' in the conveyor chain of FIG. 19 results in the conveyor chain having a substantially longer pitch as compared with the pitch of the conveyor chain 350 shown in FIGS. 14, 15, and 16. The use of a conveyor chain having a longer pitch is advantageous in those instances in which the conveyor chain is called upon to carry either lighter bakery pans or bakery pans carrying lighter loads as compared with the loading of the conveyor chain 350 of FIGS. 14, 15, and 16.

Referring now to FIG. 20, there is shown a drive mechanism 400 useful in conjunction with all of the conveyor chains illustrated in FIGS. 4 through 19, inclusive, and described hereinabove in conjunction therewith. The drive mechanism 400 includes a drive chain 402 which is trained around an idler sprocket 404, an idler sprocket 406, and a drive sprocket 407. The drive sprocket 407 is actuated by a suitable drive mechanism to cause the drive chain 402 to move around the course defined by the sprockets 404 and 406.

A plurality of chain engaging members 408 are supported on the drive chain 402 for engagement therewith. Each chain engaging member 408 includes a forward roller 410 which is rotatably supported on a pin 412 secured in the drive chain 402 and a rearward roller 414 which follows the surface of a cam 416 extending adjacent to the path of the drive chain 402.

Referring particularly to the portion of the cam 416 extending adjacent to the idler sprocket 406, if the rollers 410 and 414 were both secured to the drive chain 402, the chain engaging members 408 would accelerate during movement around the idler sprocket 406. However, the means of the engagement of the roller 414 with the cam 416, each chain engaging member 408 remains parallel to its corresponding surface on the conveyor chain until the chain engaging member 408 has moved downwardly far enough to disengage from the conveyor chain. In this manner operating power is applied to the conveyor chain evenly and without periodic intervals of acceleration as would otherwise be the case.

Figure 21:
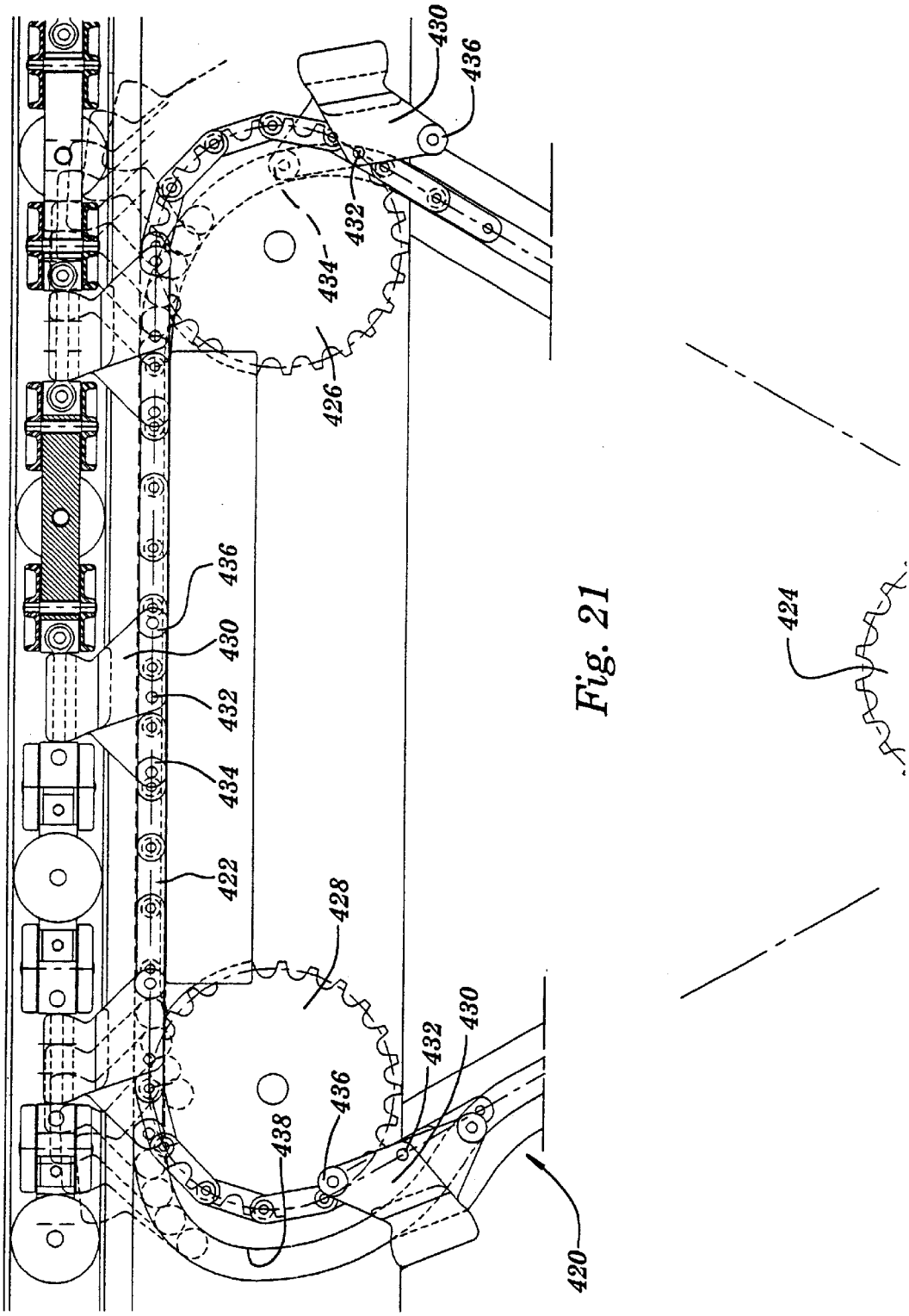
FIG. 21 is a diagrammatic illustration of a conveyor chain drive mechanism comprising a variation of the conveyor chain drive mechanism of FIG. 20.

FIG. 21 illustrates an alternative drive mechanism 420 which may be utilized in the practice of the invention. The drive mechanism 420 includes a drive chain 422 which extends around a course defined by a drive sprocket 424 and two idler sprockets 426 and 428.

The drive mechanism further includes a plurality of conveyor chain engaging members 430 each dimensioned to fully fill the space between adjacent links of a conveyor chain. In this manner the drive mechanism 420 may be utilized to apply a breaking force to the conveyor chain. This is accomplished by slowly reducing the operating power is that is supplied to the drive sprocket 424 or by completely reversing the direction of operation of the drive sprocket 424 depending upon the requirements of particular circumstances.

Each conveyor chain engaging member 430 is secured to the drive chain 422 by a pin. Each conveyor chain engaging member 430 is provided with a forward roller 434 and a rearward roller 436. The rearward roller 436 follows a cam which is substantially identical in shape and function to the cam 416 illustrated in FIG. 20. Thus, the rearward roller 436 causes the conveyor chain engaging member 430 to disengage from the conveyor chain without applying acceleration thereto.

The forward roller 434 of each conveyor chain engaging member 430 follows a track 438. The movement of the forward roller 434 in the track 438 causes each conveyor chain engaging member 430 to enter into the space between adjacent links of the conveyor chain without applying either acceleration forces or deceleration forces thereto. Thus, the conveyor chain engaging member moves smoothly into the gap between adjacent links of the conveyor chain and into engagement with both of the adjacent links without applying forces thereto which otherwise would tend to change the speed of travel of the conveyor chain.

FIG. 22 illustrates the use of the drive mechanism 420 in those instances in which the pitch of the conveyor chain is too long for the conveyor engaging members 430 to fill the entire gap between adjacent links of the conveyor chain. In such instances a spacer 440 is mounted on each connection member of the conveyor chain at a suitable location between adjacent links thereof so as to receive the chain engaging member 430 between the spacer 440 and the link of the conveyor chain situated forwardly thereof. In this manner the drive mechanism 420 functions identically to the manner in which it functions as illustrated in FIG. 21 but without the necessity of employing conveyor engaging members which are unduly long.

Figure 23:
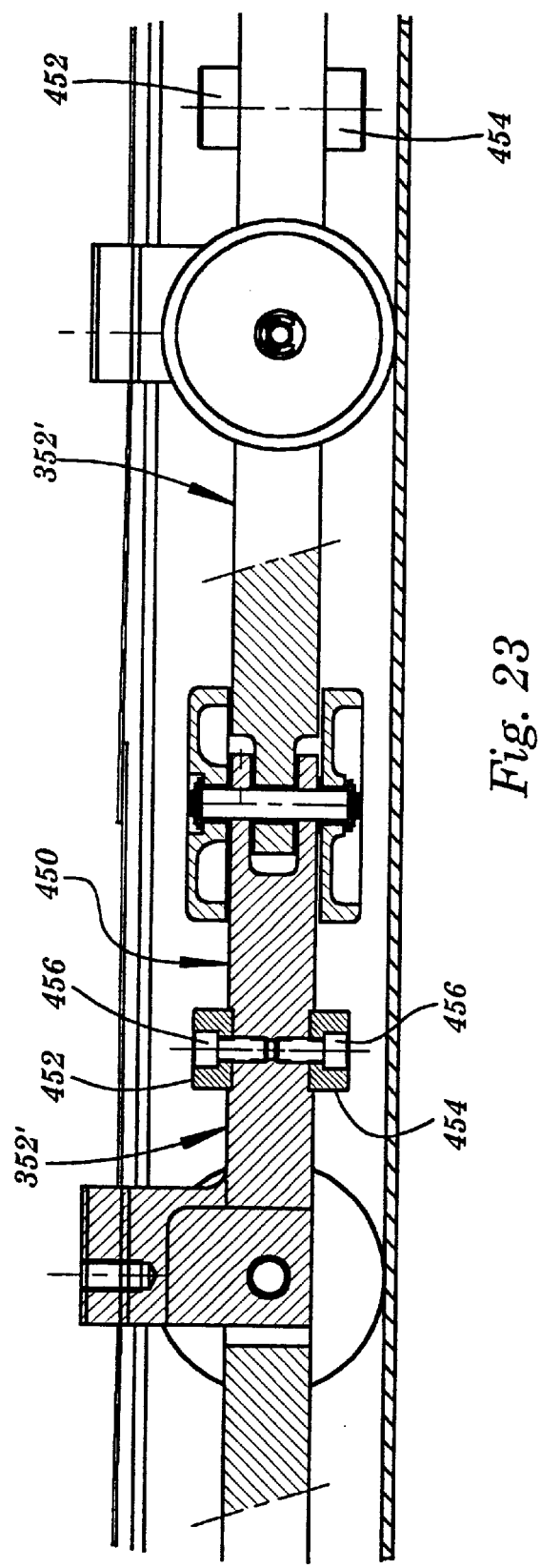
FIG. 23 is an illustration similar to FIG. 18 showing a variation of the preferred embodiment of the invention.
Figure 24:
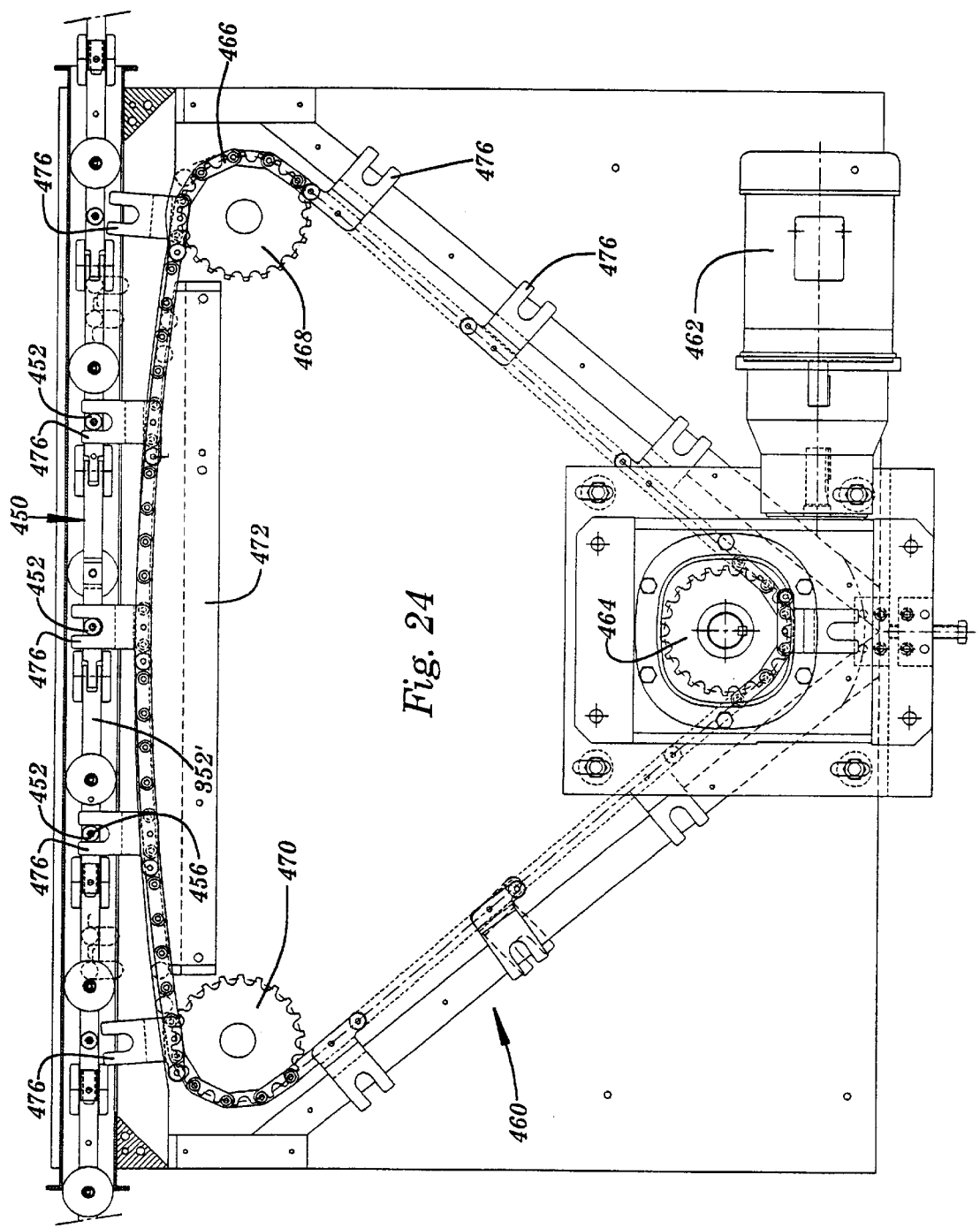
FIG. 24 is a diagrammatic illustration of a conveyor chain drive mechanism useful in conjunction with the apparatus of FIG. 23.

Referring to FIGS. 23 and 24, there is shown a conveyor chain 450 comprising a variation of the conveyor chain 350 illustrated in FIGS. 14 through 18, inclusive, and described hereinabove in conjunction therewith. The conveyor chain 450 is identical to the conveyor chain 350 except that it comprises identical links 352' each having upper and lower drive cams 452 and 454 secured thereto by fasteners 456.

FIG. 24 illustrates a drive mechanism 460 useful in conjunction with the conveyor chain 450. The drive mechanism 460 includes a drive motor 462 which actuates a drive sprocket 464. A drive chain 466 is trained around the drive sprocket 464 and two idler sprockets 468 and 470.

A drive chain cam 472 extends between the idler sprockets 468 and 470. The drive chain 466 carries a plurality of drive forks 476. Upon actuation by the drive motor 462, the drive sprocket 464 actuates the drive chain 466 to move the drive forks 476 around a course extending from the drive sprocket 464 around the idler sprocket 468, across the drive chain cam 472, around the idler sprocket 470, and back to the drive sprocket 464.

As each drive fork 476 moves into engagement with the drive chain cam 472 it is gradually lifted into engagement with one of the drive cams 452 on one of the links 352' of the conveyor chain 450, being understood that an identical drive fork engages the drive cam 454 on the opposite side of the particular link 352'. As will be appreciated by those skilled in the art, the drive chain 466 and the conveyor chain 450 move at the same speed. Therefore, the drive forks of the drive chain 466 engage the drive cams of the conveyor chain 450 without applying any acceleration force or any deceleration to the conveyor chain 450. Subsequently, the drive chain cam 472 gradually lowers each drive fork 476 out of engagement with the drive cam 452 with which it has been engaged. Again, the disengagement between the drive forks and the drive cams is accomplished without applying any acceleration force or deceleration force to the conveyor chain 450.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

We claim:

1. For use in a conveyor track of the type comprising a bottom wall, opposed side walls, and a top wall having a slot formed therein, a conveyor chain comprising:

a plurality of substantially identical carriages each comprising;
  (a) an elongate body extending between first and second ends;
  (b) two first wheel pairs supported on the body for rotation about first and second axes located adjacent the first and second ends of the body, respectively;
  (c) self-lubricated bearings supporting the first wheel pairs for rotation relative to the body;
  (d) a second wheel pair supported on the body at a location between the two first wheel pairs for rotation about an axis extending perpendicularly to the axes of rotation of the first wheel pairs;
  (e) self-lubricated bearings supporting the second wheel pair for rotation relative to the body; and connection apparatus connected between the first end of one of the carriages and the second end of the next adjacent carriage in the conveyor chain.

2. The conveyor chain according to claim 1 wherein each of the carriages includes at least one boss extending upwardly through the slot in the top wall of the conveyor track for supporting a conveyor grid.

3. The conveyor chain according to claim 1 wherein the self-lubricated bearings which support the first wheel pairs for rotation relative to the body each comprise at least one self-lubricating plastic bearing.

4. The conveyor chain according to claim 1 wherein the self-lubricated bearings which support the first wheel pairs for rotation relative to the body comprise self-lubricated anti-friction bearings.

5. The conveyor chain according to claim 1 wherein the self-lubricated bearings which support the second wheel pair for rotation relative to the body comprise at least one self-lubricating plastic bearing.

6. The conveyor chain according to claim 1 wherein the self-lubricated bearings which support the second wheel pair for rotation relative to the body comprise permanently lubricated anti-friction bearings.

7. The conveyor chain according to claim 1 wherein the self-lubricated bearings which support the first wheel pairs for rotation relative to the body each comprise at least one self-lubricating graphite bearing.

8. The conveyor chain according to claim 1 wherein the self-lubricated bearings which support the second wheel pair for rotation relative to the body comprise at least one self-lubricating graphite bearing.

9. The conveyor chain according to claim 1 further including spherical bushings mounted at the first and second ends of each of the carriages and wherein the connection apparatus comprises connection members having end portions receiving the spherical bushings on the carriages to facilitate movement of the conveyor chain along inclined and curved portions of the conveyor track.

10. The conveyor chain according to claim 1 wherein the connection apparatus comprises a wire rope extending through all of the carriages and members mounted on the wire rope for locating the carriages thereon.

11. The conveyor chain according to claim 1 wherein the first wheel pairs engage the bottom wall of the conveyor track to support the conveyor chain for movement along the conveyor track, and wherein the second wheel pair centers the conveyor chain within the conveyor track.

12. The conveyor chain according to claim 1 wherein the second wheel pair engages the bottom wall of the conveyor track to support the conveyor chain for movement along the conveyor track, and wherein the first wheel pairs center the conveyor chain in the conveyor track.

13. A conveyor apparatus comprising:
   A. a conveyor track including a bottom wall, opposed side walls, and a top wall having a slot formed therein;
   B. a conveyor chain including a plurality of carriages each comprising:
      (a) an elongate body extending between first and second ends;
      (b) connection apparatus mounted on the body at the first and second ends thereof;
      (c) two first wheel pairs supported on the body for rotation about first and second axes located adjacent the first and second ends of the body, respectively;
      (d) a second wheel pair supported on the body at a location between the two first wheel pairs for rotation about an axis extending perpendicularly to the axes of rotation of the first wheel pairs;
      (e) self-lubricated bearings supporting the first and second wheel pairs for rotation relative to the body; and
   connection members connected between the connection apparatus of the first end of one of the carriages and the connection apparatus at the second end of the next adjacent carriage in the conveyor chain.

14. The conveyor system according to claim 13 wherein each of the carriages includes at least one boss extending upwardly through the slot in the top wall of the conveyor track for supporting a conveyor grid.

15. The conveyor system according to claim 14 wherein the permanently lubricated bearings which support the first and second wheel pairs for rotation relative to the body each comprise at least one self-lubricating plastic bearing.

16. The conveyor system according to claim 14 wherein the permanently lubricated bearings which support the first and second wheel pairs for rotation relative to the body each comprise at least one self-lubricating graphite bearing.

17. The conveyor chain according to claim 14 wherein the permanently lubricated bearings which support the first and second wheel pairs for rotation relative to the body comprise permanently lubricated anti-friction bearings.

18. The conveyor chain according to claim 13 wherein the connection apparatus comprises spherical bushings mounted at the first and second ends of each of the carriages and wherein connection members have end portions which receive the spherical bushings on the carriages to facilitate movement of the conveyor chain along inclined and curved portions of the conveyor track.

19. The conveyor chain according to claim 13 wherein the first wheel pairs engage the bottom wall of the conveyor track to support the conveyor chain for movement along the conveyor track, and wherein the second wheel pair centers the conveyor chain within the conveyor track.

20. The conveyor chain according to claim 13 wherein the second wheel pair engages the bottom wall of the conveyor track to support the conveyor chain for movement along the conveyor track, and wherein the first wheel pairs center the conveyor chain in the conveyor track.

21. For use in a conveyor track of the type comprising a bottom wall, opposed side walls, and a top wall having a slot formed therein, a conveyor chain comprising:
   a plurality of substantially identical carriages each comprising:
      (a) an elongate body extending between first and second ends;
      (b) two first wheel pairs supported on the body for rotation about first and second axes located adjacent the first and second ends of the body, respectively;
      (c) a second wheel pair supported on the body at a location between the two first wheel pairs for rotation about an axis extending perpendicularly to the axes of rotation of the first wheel pairs;
      (d) self-lubricated bearings supporting first and second wheel pairs for rotation relative to the body;
   an elongate flexible member extending through all of the carriages; and
   apparatus mounted on the elongate flexible member for positioning the carriages thereon.

22. The conveyor chain according to claim 21 wherein the self-lubricated bearings which support the first and second wheel pairs for rotation relative to the body each comprise at least one self-lubricating plastic bearing.

23. The conveyor chain according to claim 21 wherein the self-lubricated bearings are graphite bearings.

24. The conveyor chain according to claim 21 wherein the elongate flexible member is a wire rope and wherein the positioning apparatus comprises compression sleeves mounted on the wire rope and engaging the first and second ends of each carriage.

* * * * *